United States Patent [19]
Garland et al.

[11] Patent Number: 5,564,655
[45] Date of Patent: Oct. 15, 1996

[54] RIGGING OF AIRCRAFT WING FLAPS

[75] Inventors: Philip H. Garland; Michael J. Conner; Peter R. Gill, all of Bristol, Great Britain

[73] Assignee: British Aerospace Public Limited Company, Farnborough, Great Britain

[21] Appl. No.: 400,255

[22] Filed: Mar. 8, 1995

[30]     Foreign Application Priority Data

Mar. 15, 1994 [GB] United Kingdom ............... 9405001

[51] Int. Cl.$^6$ ........................................ B64C 9/16
[52] U.S. Cl. .................. 244/216; 244/214; 244/213; 244/117 R; 33/1 BB; 24/418
[58] Field of Search ..................... 244/214, 216, 244/213, 215, 117 R; 24/418; 269/79; 33/1 B, 501.05, 655, 827, 613, 501.02, 501.3

[56]         References Cited

U.S. PATENT DOCUMENTS 2,665,489  1/1954  Cunningham ............... 33/827
5,033,695  7/1991  Foshee et al. ............... 244/213
5,161,757  11/1995  Large ........................... 244/213
5,407,153  4/1995  Kirk et al. ................... 244/213

FOREIGN PATENT DOCUMENTS 1332108  10/1973  United Kingdom .

*Primary Examiner*—Andres Kashnikow
*Assistant Examiner*—Tien Dinh
*Attorney, Agent, or Firm*—Nixon & Vanderhye P.C.

[57]            ABSTRACT

Apparatus, method and an arrangement for rigging an aircraft wing flap are provided. The apparatus (27) is for measuring horizontal and vertical positioning of a trailing edge (21) of a wing flap (14, 15) relative to a flap track beam (6) upon which the flap (14, 15) is mount for deployment movement. The flap track beam (6) is affixed to a wing main torsion box (1) behind which the flap (14, 15) is deployable. The apparatus (27) engages the trailing edge (21) of the flap (14, 15) to allow accurate horizontal and vertical positional measurement of the trailing edge.

14 Claims, 5 Drawing Sheets

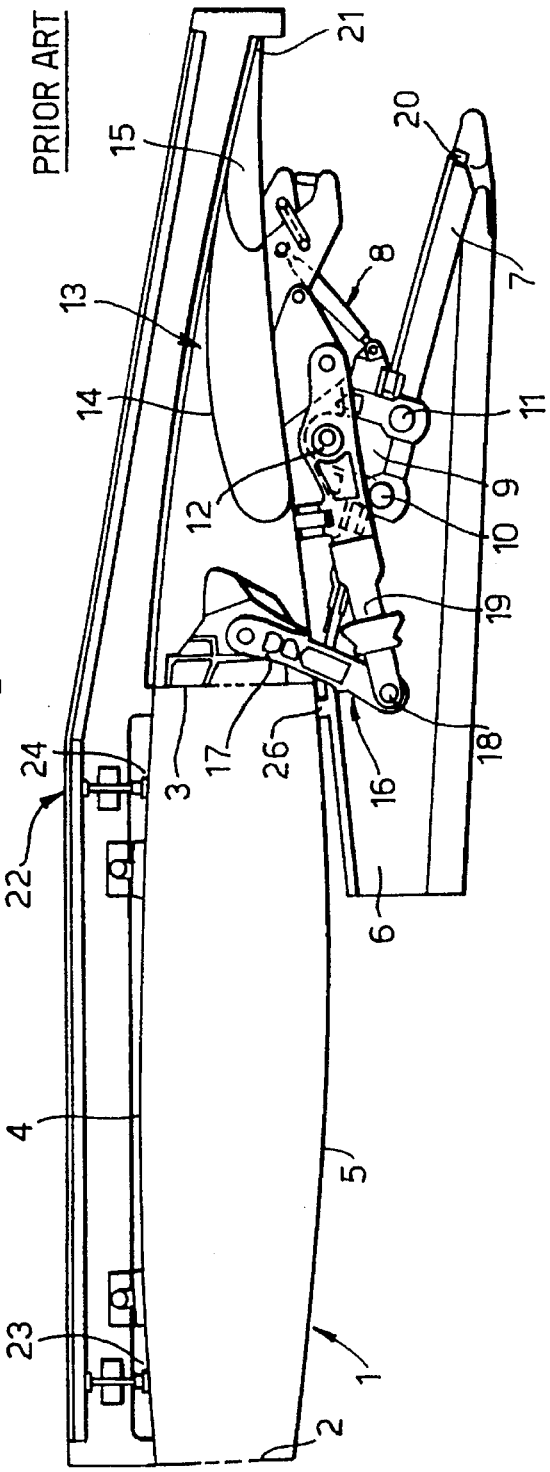
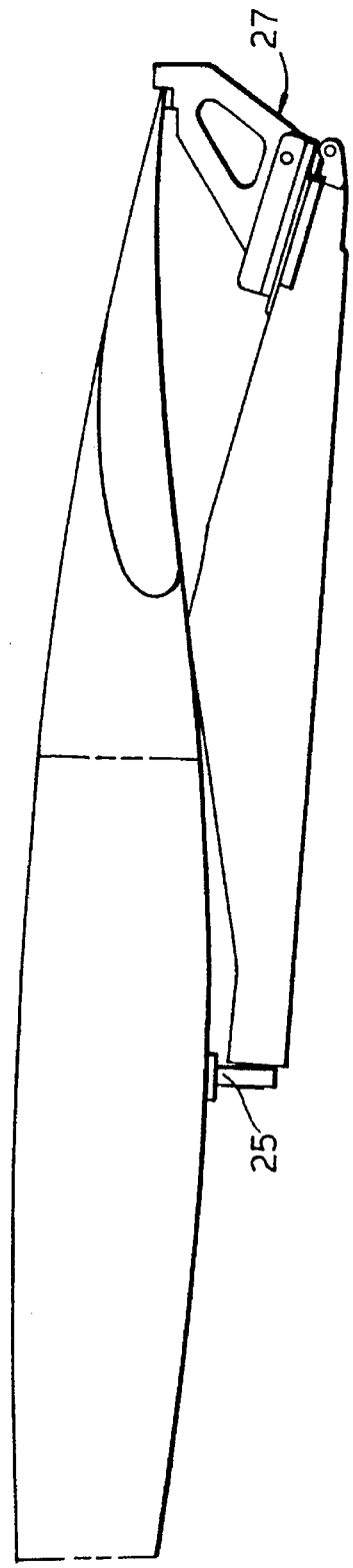
Fig. 1. PRIOR ART
Fig. 3.

Fig.14.
Fig.15.
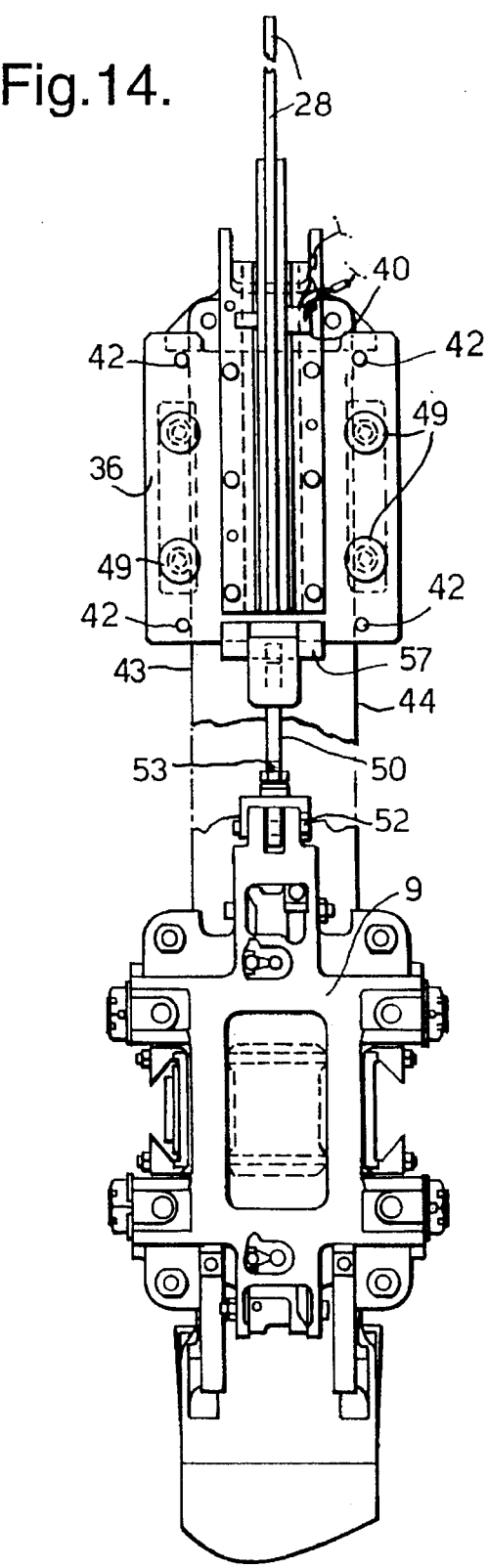
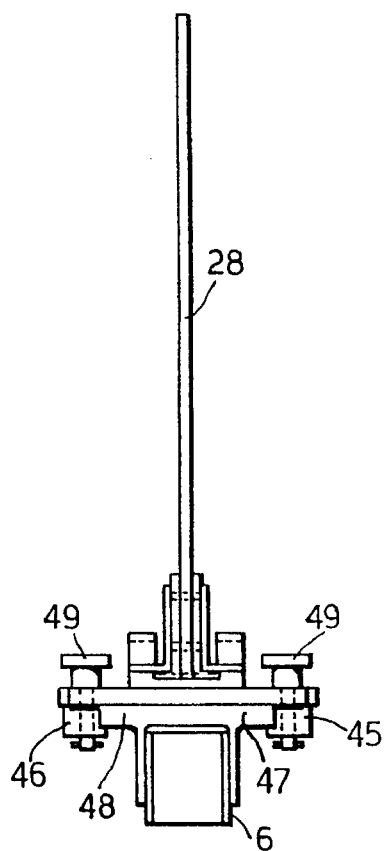

RIGGING OF AIRCRAFT WING FLAPS

BACKGROUND TO THE INVENTION

1. Field of the Invention

This invention relates to rigging of aircraft Wing flaps, more particularly it relates to the rigging of trailing edge flaps for aircraft wings.

2. Discussion of Prior Art

"Rigging" or accurate positional setting of aircraft trailing edge flaps to a "zero" or in-flight cruise position requires the movable trailing edge flap to be accurately rigged with respect to the vertical positioning of its upper surface and the fore and art positioning of its trailing edge, both being in relation to a fixed wing structure of the aircraft. Such fixed wing structure is usually a central main torsion box of the wing comprising front and rear spanwise extending spars and upper and lower wing skins connecting the spars. For commercial aircraft the in-flight cruise configuration of a wing is critical as the fuel efficiency of the aircraft depends largely upon the aerodynamic efficiency of the wing when in cruise.

Trailing edge flaps may be movable between several positions to provide varying degrees of lift enhancement to the wing for operations such as take-off and landing and low speed approach. For these operations the trailing edge flap is movable between a cruise position in which it sits immediately behind the wing box with its upper and lower surfaces forming continuations of extentions from the wing box upper and lower skin surfaces and one or more deployed positions in which the flap is translated rearwardly and downwardly from the cruise position at the same time as being rotated. This combined translatory and rotational movement is normally achieved, at least on civil aircraft, by mounting the flap on two or more flap track beams depending downwardly and rearwardly from the wing box and affixed thereto. The flap is normally mounted for rolling or sliding movement along a track of the flap track beam. Where rolling movement is provided the flap is normally pivotally mounted on a wheeled carriage which rolls on the said track of the beam. Rearward deployment of the flap from the cruise position is then achieved by some form of actuating means which, usually in a combined movement, translates the carriage rearwardly along the track of the beam at the same time as pivoting the flap about its pivot on the carriage. Alternatively, or in addition, a curved track on the beam may provide the rotational movement of the flap during rearward translation.

Although the relative positioning of the upper surface of the flap and the upper skin of the wing box in a vertical plane is critical, to date methods and tools used for flap rigging have been subject to considerable variation depending upon the air temperature and time of day at which flap rigging has taken place. This is because known flap rigging tools are located on the upper skin of the wing box and such location has allowed changes in camber of the wing box with temperature variation greatly to affect the relative positions of parts of the tool from which flap setting measurements were taken and the flap trailing edge. In addition to this, these known tools are of considerable length and thereby subject to distortion and damage.

SUMMARY OF THE INVENTION

It is an object of the invention to provide means for rigging an aircraft wing flap which overcome the disadvantages of the prior art.

According to one aspect of the invention there is provided apparatus for rigging an aircraft wing flap mounted for deployment movement along a beam affixed to a main torsion box of the wing, the apparatus extending between the beam and a trailing edge of the flap for measuring the separation therebetween.

In this way distortions of the measurement of the position of the trailing edge of the flap due to varying external temperatures are largely eliminated because the relative separation of flap and beam remain largely unchanged with ten stature variation.

The apparatus preferably includes means for positively locating the apparatus with respect to the beam. Repeatable accuracy of measurements is thereby ensured.

In order further to increase accuracy of measurement the apparatus preferably includes means to engage the flap trailing edge.

This engagement means may include at least one rest to carry the weight of the trailing edge and the at least one rest may include a series of rests positioned on the apparatus for rigging flaps located at different spanwise positions on the wing.

Conveniently the rests are stepped with respect to one another and each rest may include a substantially vertical element associated therewith for measuring the horizontal location of the flap trailing edge relative to the beam.

In order to provide greater flexibility of measurement and/or to prevent excessive wear to the rests, the engagement means may include at least one setting gauge preferably separable from the remainder of the apparatus and positionable between the flap trailing edge and its rest.

The apparatus may include adjustable restraining means adjustably to position the flap along the beam during rigging. The adjustable restraining means is desirably engagable with a carriage for the flap which mounts the flap for said deployment movement along the beam.

According to a second aspect of the invention there is provided an arrangement for rigging an aircraft wing flap, the arrangement including a main torsion box for the wing, a beam mounted thereon, the wing flap mounted for deployment movement along the beam and apparatus according to the first aspect the invention extending between the beam and a trailing edge of the flap for measuring the separation therebetween.

According to a third aspect of the invention there is provided a method of rigging an aircraft wing flap mounted for deployment movement along a beam affixed to a main torsion box of the wing, the method including the step of taking at least one positional measurement of the flap relative to the beam.

Taking the positional measurement in this way again largely eliminates temperature dependent variations in the measurement.

The method may include measuring the position of a trailing edge of the flap substantially vertically and/or substantially horizontally relative to the beam.

Preferably the method includes the steps of disconnecting drive means for providing the deployment movement of the flap, connecting adjustable restraining means between the beam and the flap, carrying out adjustment of the flap position on the beam with the restraining means in accordance with at least a substantially horizontal positional measurement of the flap relative to the beam, reconnecting the drive means and disconnecting the adjustable restraining means.

BRIEF DESCRIPTION OF THE DRAWINGS

The invention will now be described by way of example with reference to the accompanying drawings of which:

FIG. 1 is a partial side elevation of an arrangement foe rigging an aircraft wing flap according to the prior art, FIG. 3 shows an arrangement for rigging an aircraft wing flap according to the invention in side elevation, FIG. 15 is a view on the line XV—XV of FIG. 14.

DESCRIPTION OF THE PREFERRED EMBODIMENT

Figure 2:
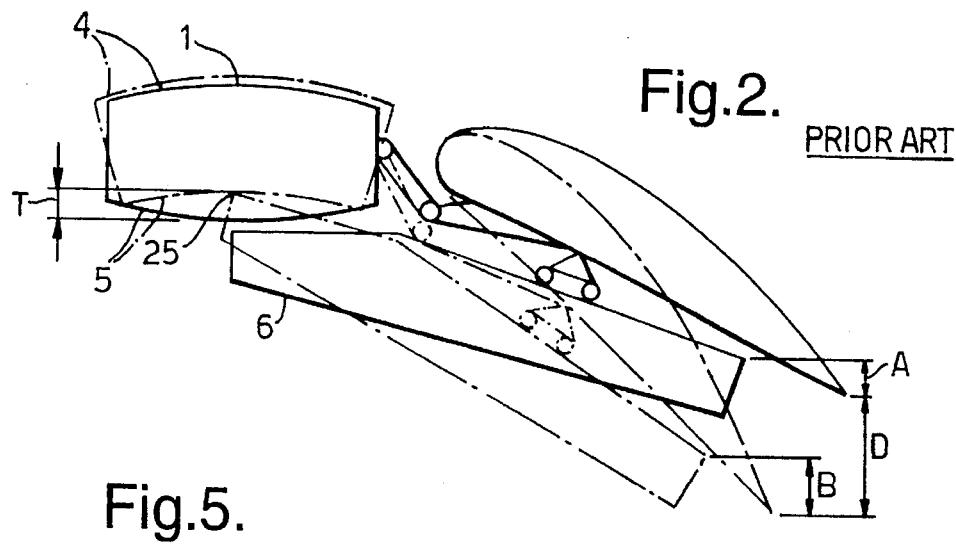
FIG. 2 shows schematically in side elevation part of an aircraft wing with and without deflection owing to temperature changes in the wing.

Referring to FIG. 1 an arrangement according to the prior art is shown. Part of an aircraft wing is shown in which a main torsion box 1 of the wing con, rises front and rear spars 2, 3 connected by upper and lower wing skins 4, 5. Affixed to the torsion box 1 is a flap track beam 6 and mounted for deployment movement on a track 7 of the beam is a flap and carriage assembly 8. The assembly 8 comprises a carriage 9 mounted for sliding movement along the track 7 on rollers 10, 11 and supports via an eccentric pivot bearing 12 a flap assembly 13. The flap assembly 13 is divided into a flap 14 and a tab 15 mounted for pivotal deployment movement with respect to the flap 14. The flap and carriage assembly 8 is deployed by a flap actuating mechanism 16. This actuating mechanism includes an actuating 1ever driven, via a gear box (not shown) from a high speed drive shaft extensible along the wing (not shown). Connected via a connecting pin 18 to the actuator lever 17 is a drive arm lever 19 to which is rigidly attached the flap assembly 13. The drive arm lever 19 rotatably engages the carriage 9 via the eccentric pivot bearing 12.

It will be appreciated that operation of the flap actuating mechanism 16 will drive the flap and carriage assembly 8 along the track 7 of the beam and at the same time will cause rotation of the flap assembly 13 about the eccentric pivot bearing owing to the rotation thereabout of the drive arm lever 19 during deployment movement. When the flap and carriage assembly 8 reaches its fully deployed position the carriage 9 will engage an end stop 20 on the flap track beam 6.

Although the flap assembly 13 is divided into two by comprising the flap 14 and the tab 15, for purposes of rigging the flap assembly the wing will be in its cruise configuration as shown with the flap and tab in close abutment to one another. For these purposes therefore a trailing edge 21 of the tab constitutes a trailing edge of the flap assembly 13 which, for other applications, may comprise a single flap rather than a two element flap assembly.

Mounted to the upper wing skin 4 of the wing torsion box 1 is a flap rigging board 22 according to the prior art. The rigging board 22 is positioned on the upper wing skin 4 by aligning the board with marks 23, 24 on the upper wing skin. It will thus be appreciated that the ragging board has no positive location on the wing torsion box in a horizontal plane.

Measurement of the position of the trailing edge 21 of the flap in a substantially vertical plane is made using the rigging board 22. But no measurement of the position or the trailing edge 21 in a substantially horizontal plane is possible owing to the lack of positive location of the rigging board 22 on the wing torsion box 1.

A further disadvantage of this apparatus according to the prior art is illustrated in FIG. 2. FIG. 2 shows (greatly exaggerated) the effect on deployment position of the flap of changes in wing temperature which can occur under certain conditions. When the upper skin 4 of the wing is subjected to strong sunlight its temperature relative to that of the lower wing skin 5 can sometimes vary by as much as 30 degrees centigrade. This will cause an expansion of the upper wing skin 4 relative to the lower wing skin 5, as shown. Because the location of a forward support 25 of the flap track beam 6 on the lower wing skin the flap track beam will effectively pivot about a rear support 26 such that the flap assembly 13 is caused to deflect downwardly. This downward deflection at the trailing edge of the flap can be of the order of several millimeters. With flap rigging measurements taken from a rigging board of the type shown in FIG. 1 it will be appreciated that the attitude of the rigging board 22 will not change substantially with temperature variation owing to the substantially symmetrical nature of the wing torsion box distortion. Flap rigging carried out at extremes of temperature could therefore result in inaccuracies of the order of millimeters in a vertical plane when using the setting board according to the prior art.

Having regard to FIG. 2 it will be seen that a relatively small vertical deflection T of the lower wing skin causes a large vertical deflection D of the trailing edge of the flap. This deflection D reflects the likely measurement error of the vertical position of the trailing edge of the flap that can occur using the setting board rigging method according to the prior art. When the flap is rigged according to the invention however any vertical measurement error owing to temperature changes affecting the shape of the wing will only be reflected by the difference between the dimensions A and B, shown in FIG. 2. As will be described more fully below this is because the apparatus according to the invention takes the measurement between the flap track beam 6 and the trailing edge of the flap 21 and, during temperature changes in the wing, both flap and flap track beam move in a vertical sense substantially together as the flap assembly 13 is mounted on the beam 6. It will thus be seen that inaccuracies of flap rigging in a vertical plane are substantially reduced when the method and apparatus of the invention are employed.

FIGS. 3–15 illustrate embodiments according to the invention. FIG. 3 illustrates, as a comparison with FIG. 1, the use of apparatus 27 according to the invention with a wing assembly. It will be seen at once that the apparatus according to the invention is far more compact and easily portable. It will be far less susceptible to damage, in practice. Also dimensional errors will be minimised as compared with the comparatively long rigging board of the prior art. In addition, the apparatus may be positively located on the flap track beam 6 by clamping same in position against the end stop 20 of the flap track beam and/or with a dowel 41 engaged in an aperture in the beam. The potential for errors in measurement is thereby further reduced and the positioning and geometry of the apparatus allows the position of the trailing edge of the flap to be accurately measured in a substantially horizontal plane as well as a substantially vertical plane.

Figure 4:
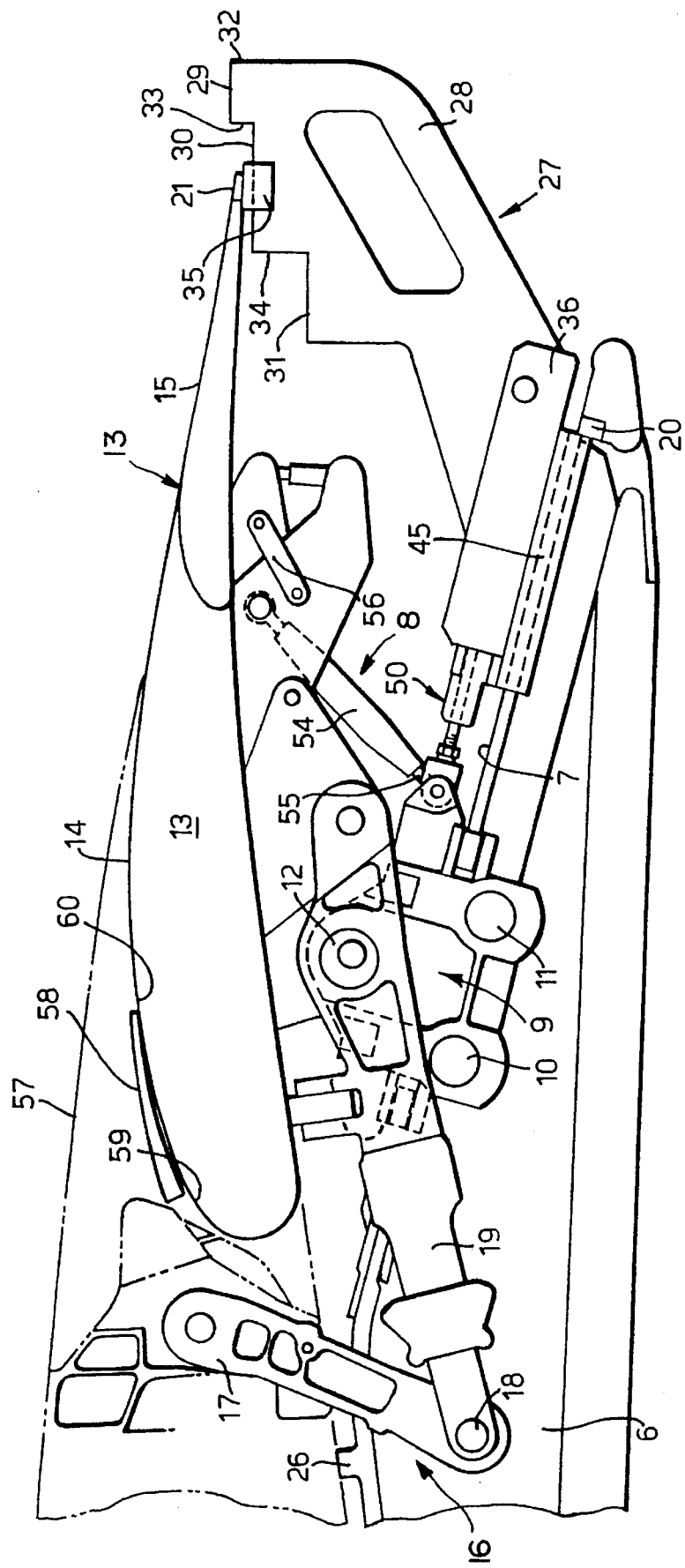
FIG. 4 shows an alternative, more detailed partial representation of the arrangement shown in FIG. 3.
Figure 8:
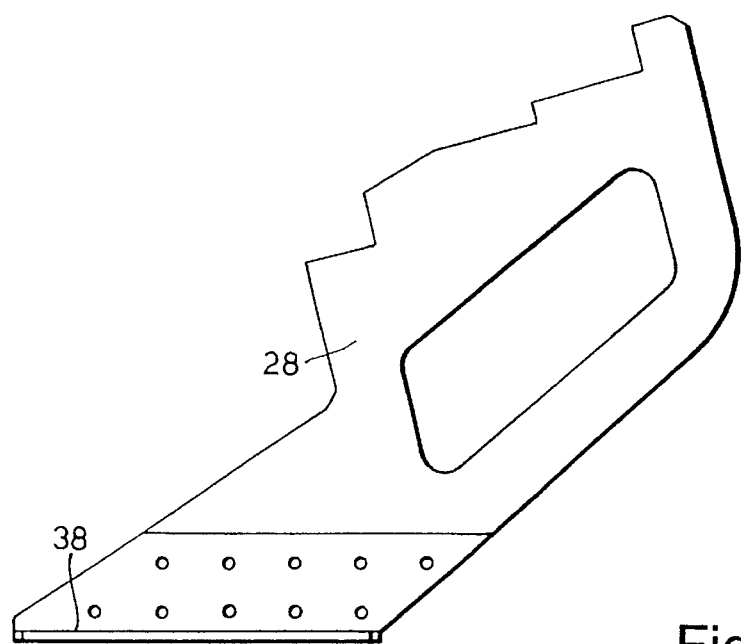
FIG. 8 is a side elevation of a stepped extension of the apparatus of the invention.
Figure 9:
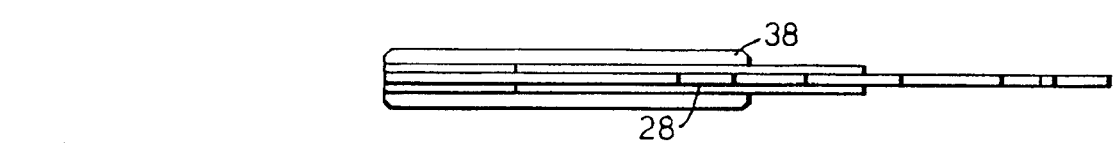
FIG. 9 is a top plan view of the stepped extension of FIG. 8.
Figure 10:
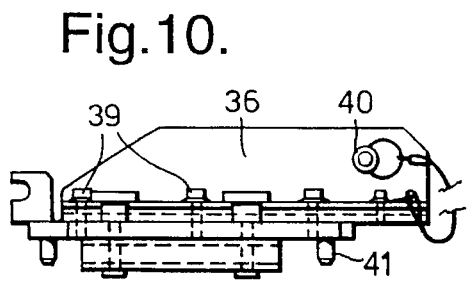
FIG. 10 is a side elevation of a base portion of the apparatus.

Referring to FIG. 4 an arrangement according to the invention is shown in detail. The apparatus 27 of the invention comprises a vertically extending stepped extension 28 having three rests 29, 30, 31 forming the steps. Substantially vertical elements 32, 33, 34 associated with rests 29, 30, 31, respectively, enable both horizontal and vertical positional setting of the trailing edge 21 of the flaps. A setting gauge 35 forms a saddle to straddle the rest 30 and is of a known height for engaging the trailing edge of the flap to allow same to rest on the apparatus without causing undue wear to the rests 29, 30, 31. The setting gauge 35 is of a hardened material.

The stepped extension 28 is mounted on a slotted base 36, see also FIGS. 10, 11, 14, 15. A slot 37 in the base slidably receives a T-piece 38 which is then clamped firmly in position using fasteners 39. A through bolt 40 provides longitudinal location of the extension 28 in the base and a dowel 41 provides longitudinal location of the base in the flap track beam. Lateral location of the base on the flap track beam is provided by four secondary dowels 42 abutting edges 43, 44 of the flap track beam. The base is held in position on the flap track beam by two clamps 45, 46 engagable under flanges 47, 48 of the flap track beam and secured by bolts It will therefore be appreciated that the apparatus according to the invention is rigidly and positively attached to the flap track beam to enable accurate positional measurements of the trailing edge of the flap to be made.

Figure 12A:
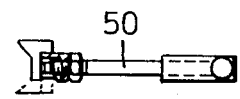
FIG. 12a is a side elevation of adjustable restraining means according to the invention.
Figure 12B:
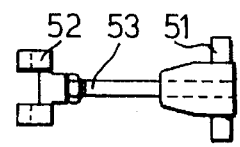
FIG. 12b is a top plan view of the restraining means of FIG. 12a, FIG. 13a is a side elevation of a setting gauge for use on the stepped extension of the apparatus.
Figure 11:
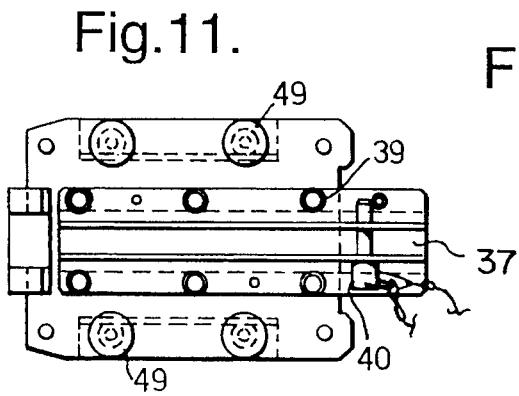
FIG. 11 is a to plan view of the base portion.
Figure 13A:
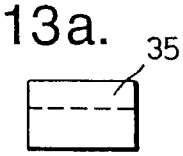
FIG. 13b is a top plan view of the setting gauge FIG. 13a, FIG. 13c is an end elevation of the setting gauge of FIG. 13a, FIG. 14 is a top plan view of the apparatus of the invention mounted on a flap track beam and connected to a carriage for supporting wing flap.
Figure 13B:
Figure 13C:

In order that the carriage 9 may be supported and adjustably located when the flap actuating mechanism 16 is disconnected an adjustable carriage restraint 50 is provided to act between the base 36 and carriage 9. The carriage restraint, shown best in FIGS. 4, 12, 14, is threaded to provide length adjustment and is mounted for vertical pivotal movement at eight end by pivot members 51 and 52. Fine adjustment of the carriage along the flap track beam is therefore provided by a fine pitch thread 53 on the restraint 50.

Referring to FIG. 4, when a double slotted flap is employed as shown, it is necessary rigidly to connect the tab 15 to the flap 14 for purposes of rigging. A Cab drive rod 54 is therefore disconnected at a lower end 55 thereof and a distance gauge 56 substituted accurately to position the flap and tab in relation to one another during rigging.

A kink shroud 57 covers a forward portion of the flap 14 and a rubbing pad 58 is provided for engagement with the flap 14 in the cruise condition. Measurements ere taken of separation between the flap and kink shroud at positions 59 and 60 immediately fore and aft of the rubbing pad during rigging.

Figure 5:
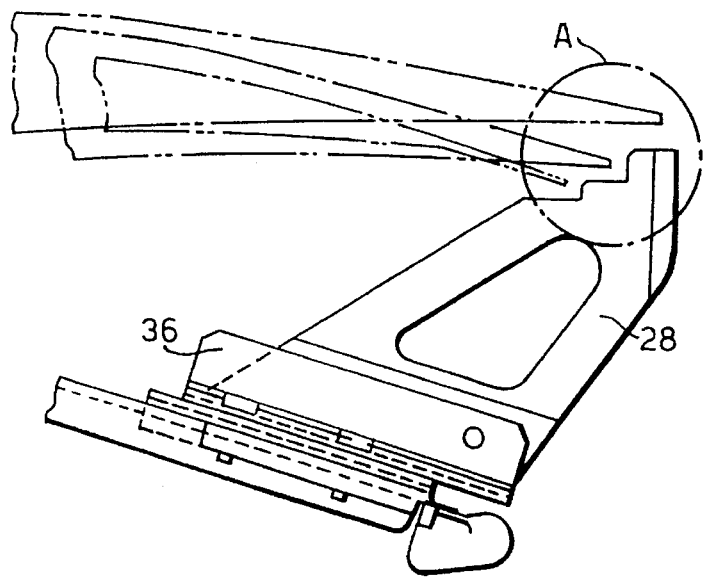
FIG. 5 shows apparatus according to the invention in use with three different spanwise located flaps.
Figure 6:
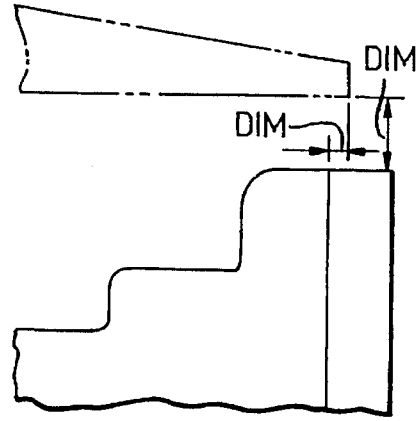
FIG. 6 is one version of detail A of FIG. 5.
Figure 7:
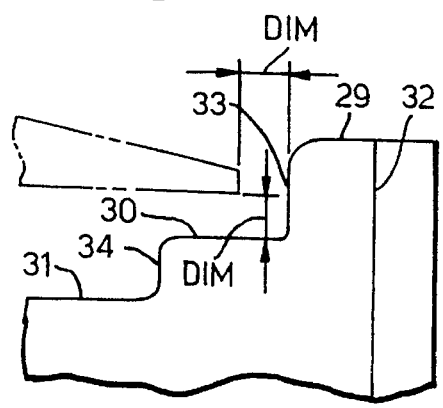
FIG. 7 is an alternative version of detail A of FIG. 5.

Referring to FIGS. 5, 6, 7 dimensions taken for vertical and horizontal rigging of the flap are shown for alternative flaps.

In use, the apparatus 27 of the invention is clamped in position on the flap track beam 6. The trailing edge 21 is then supported whilst the tab drive rod 54 is disconnected and the distance gauge fitted to support the tab in the nominal position. The adjustable carriage restraint 50 is then engaged between the carriage 9 and the base 36 of the apparatus and the connecting pin 18 in the flap actuating mechanism is removed to disengage the drive to the flap and carriage assembly 8. Rigging then continues until horizontal and vertical measurements being taken of the dimensions Shown in FIGS. 5, 6, 7 with comparison checks being carried out at positions 59 and 60 and with consequent adjustments of the eccentric pivot bearing 12 and carriage restraint 50 in order to achieve the desired dimensions and positioning of the flap assembly 13.

It will be appreciated that the above procedure and the procedure outlined subsequently must be carried out at each track for a given flap (normally two per flap). Any variations at one flap track caused by adjustments at the other must of course be adjusted out.

Once the flap is positioned accurately using the method and apparatus of the invention the flap actuating mechanism 16 must be reconnected. If the connecting pin 18 cannot be re-engaged, the actuator lever 17 must be adjusted, in order effectively to "re-zero it", before reconnection. This will normally be achieved by disconnecting the drive gear box (not shown) from the spanwise extending drive shaft (not shown), rotating the shaft at the connection with the drive shaft by a small amount, perhaps half a turn, and attempting again to fit the connecting pin 18. Once the connecting pin is refitted the gear box connection with the drive shaft is re-engaged and rigging is complete. The tab drive rod 24 may now be reconnected and the distance gauge 56 removed. The adjustable carriage restraint can be disconnected and the apparatus 27 removed from the flap track beam 6.

We claim:

1. An arrangement for rigging an aircraft wing flap comprising:

a main torsion box for the wing;

a beam mounted thereon;

the wing flap mounted for deployment movement along the beam; and an apparatus for use in rigging an aircraft wing flap comprising:

mounting means located on said beam; and an extension extending between the beam and a trailing edge of the flap for measuring the separation therebetween.

2. Apparatus as in claim 1 wherein said mounting means includes means for positively locating the apparatus with respect to the beam.

3. Apparatus as in claim 1 wherein said extension includes means for engaging the flap trailing edge.

4. Apparatus as in claim 3 in which the engaging means includes at least one rest to carry the weight of the trailing edge.

5. Apparatus as in claim 4 in which the at least one rest includes a series of rests positioned on the extension for rigging flaps located at different spanwise positions on the wing.

6. Apparatus as in claim 5 in which the rests are stepped with respect to one another.

7. Apparatus as in claim 6 in which each rest includes a substantially vertical element associated therewith for measuring the horizontal location of the flap trailing edge relative to the beam.

8. Apparatus as in claim 4 in which the engaging means includes at least one setting gauge positionable between the flap trailing edge and its rest.

9. Apparatus as in claim 1 further including adjustable restraining means adjustable to position the flap along the beam.

10. Apparatus as in claim 9 in which the adjustable restraining means is engagable with a carriage for the flap which mounts the flap for said deployment movement along the beam.

11. A method of rigging an aircraft wing flap mounted for deployment movement along a beam affixed to a main torsion box of the wing including the steps of:

taking at least one positional measurement of the flap relative to the beam; and adjusting the position of the flap relative to the beam in accordance with said positional measurement.

12. A method as in claim 11 wherein said positional measurement step comprises a step of measuring the position of a trailing edge of the flap substantially vertical relative to the beam.

13. A method as in claim 11 wherein said positional measurement step comprises the step of measuring the position of a trailing edge of the flap substantially horizontally relative to the beam.

14. A method as in claim 13 further including the steps of:

disconnecting drive means for providing the deployment movements of the flap;

connecting adjustable restraining means between the beam and the flap;

carrying out adjustment of the flap position on the beam with the restraining means in accordance with at least a substantially horizontal positional measurement of the flap relative to the beam;

re-connecting the drive means, and disconnecting the adjustable restraining means.

* * * * *